Figure 1:
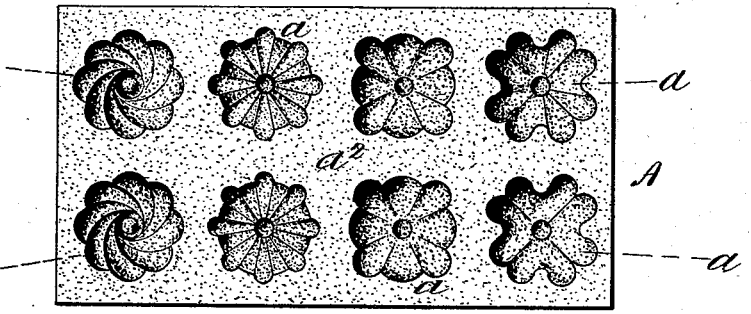

(No Model.)

W. E. COLEMAN.
FLEXIBLE CANDY MOLD.

No. 534,632. Patented Feb. 26, 1895.

Witnesses:
A. W. Gardner.
Hjr Borglund Jr.

Inventor.
Walter E. Coleman,
By his Attorney
George William Miatt

UNITED STATES PATENT OFFICE.

WALTER E. COLEMAN, OF NEW DORP, NEW YORK.

FLEXIBLE CANDY-MOLD.

SPECIFICATION forming part of Letters Patent No. 534,632, dated February 26, 1895.

Application filed December 28, 1892. Serial No. 456,606. (No model.)

*To all whom it may concern:*

Be it known that I, WALTER E. COLEMAN, a citizen of the United States, residing at New Dorp, in the county of Richmond and State of New York, have invented certain new and useful Improvements in Flexible Candy-Molds, of which the following is a description sufficient to enable others skilled in the art to which the invention appertains to make and use the same.

My present invention is an improvement upon the flexible candy-mold described in my Patent No. 371,176, issued October 11, 1887, which discloses a solid mat of flexible material in which the matrices are formed. While the said mold has proved of practical utility and answers the purpose designed, I have discovered certain objections to the solid mat which it is the object of my present invention to overcome. For instance, owing to the fact that comparatively pure, expensive india-rubber is requisite in the manufacture of a good, servicable quality of such mats, the mass of solid material between the matrices, and forming the side walls thereof, adds materially to the cost of production, without compensating advantage. On the contrary, owing to this thickness and solidity of the mat between the matrices, although the mat may be made of the best of elastic or semi-elastic material, it is not as flexible between the matrices as is desirable, and hence the side walls of the matrices are split transversely as set forth in said patent, to facilitate the discharge of the candy castings; but the most serious objection to this old form of solid mold arises from the fact that the mass of material between the matrices impedes the cooling and "setting" of the candy casts, not only causing delay, but also rendering the cooling process uneven, since the exposed surface of the candy will part with its excess of heat much more rapidly than the surfaces inclosed by the thick parts of the mold. I obviate all these dfficulties by my present invention, which consists, in a permanent flexible skeleton candy-mold formed with air spaces between the exterior side walls of the matrices,—the side walls of the matrices being comparatively thin and preferably conforming approximately in convex configuration to the inner concave surfaces thereof.

The practical advantages attained by the skeleton mold are numerous. A mold of a given size or capacity can be made from one-half to one-third lighter in weight than the old form of solid mold, thus materially decreasing the cost while facilitating the handling and manipulation of the mat.

My improved construction also obviates all need of splitting the side walls of the matrices transversely, since the side walls are thin and elastic and free to yield laterally, so that the candy castings are easily discharged from the mold when the latter is bent slightly.

My invention also insures a more rapid and uniform cooling of the candy castings than heretofore, the heat escaping readily through the side walls of the matrices and being taken up and conveyed away by the air, which is free to circulate around and between the exterior walls of the matrices. It is to be observed in this connection that I do not confine myself to a skeleton mold in which the exterior surfaces of the side walls of the matrices conform in general shape to the concave surfaces of the matrices, since the formation of any space or spaces in or between the side walls of the matrices would come within the spirit and intent of my invention, I having been the first to make the back of the mold open, or with air spaces between the side walls of the matrices.

In the accompanying drawings for convenience of illustration I show a mat formed with eight matrices of different shapes, although in practice the mats are larger and contain a greater number of molds.

Figure 2:
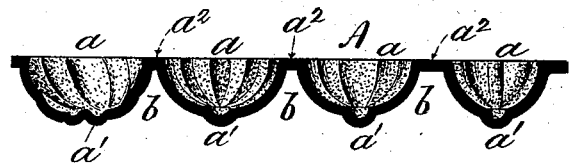
Figure 3:
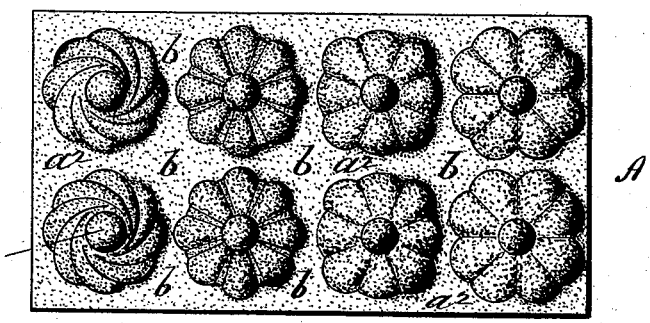
Figure 4:
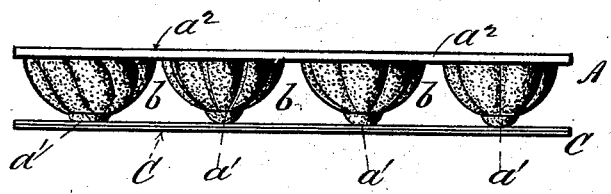
Figure 5:
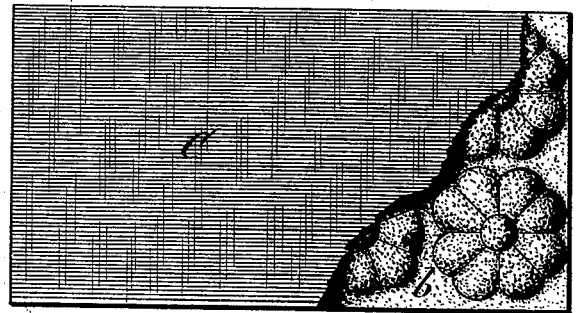

Figure 1, is a top view of the mat or mold looking into the matrices. Fig. 2, is a longitudinal section of the mat through the centers of one series of matrices. Fig. 3, is a view of the under side of the mat or mold; Fig. 4, an edge view of my improved skeleton mat or mold provided with a reinforcing strip or backing; Fig. 5, a view of the under side of the mat shown in Fig. 4, with a portion of the backing broken away.

The mold or mat A, is formed of india-rubber or other suitable material or compound, the matrices being formed by pressing the material while in a plastic state over a series of suitable dies, and then permanently setting the material to give it the desired consistency by vulcanization; or the mat of matrices may be formed in any other suitable manner. When the plastic material is applied to the dies, of which there is one for each matrix $a$, it is forced closely around the dies in such manner as to leave spaces $b, b$, between the exterior side walls of the matrices, the said side walls being regulated in thickness according to the character of the material employed and with relation to the character of the designs, work to be performed, &c. These air spaces $b, b$, may be of greater or less extent or depth as may be required; and though the side walls of the matrices are preferably made to conform in general shape to the configuration of the designs impressed therein by the dies, this is not indispensable since the air spaces $b, b$, may be made in the form of grooves running longitudinally and transversely across the back of the mat or mold and between the several matrices; or the air spaces $b, b$, may be formed or shaped in any other desired or convenient manner,—the essential feature being the formation of open air spaces in the back of the mold or mat and between the exterior side walls of the matrices, for the purpose of lightening the mold, rendering it more flexible, and facilitating the cooling of the castings.

The skeleton mat A, may be advantageously used alone, as shown in the first three figures of the drawings, the bottoms $a', a'$, of the matrices resting against the table or other support.

In some cases I reinforce, sustain and protect the side walls of the matrices by a reinforcing strip or backing C, which may consist of any elastic or semi-elastic material, or even of a strip of canvass or cloth. Only the extreme lower exterior edges or surfaces of the bottoms $a'$, of the matrices are attached to the backing C, and this is effected during vulcanization, or by any other suitable means. By the use of this backing C, the side walls of the matrices may be made thinner than would otherwise be practicable so that the backing does not necessarily add to the weight of the mat as a whole.

It will be noticed that by my improved construction the front edges of the matrices $a, a$, are connected by a comparatively thin web or sheet $a^2, a^2$, of elastic material, so that the skeleton molds thus produced can be bent backward until the exterior side walls of adjoining matrices nearly touch without distorting the matrices materially themselves.

What I claim as my invention, and desire to secure by Letters Patent, is—

A permanent flexible mold for the manufacture of confectionery, formed with suitable matrices and with air-spaces between the exterior side walls of said matrices, for the purpose and substantially in the manner decribed.

WALTER E. COLEMAN.

Witnesses:
D. W. GARDNER,
GEO. WM. MIATT.